United States Patent

Carlson

[11] 4,035,657
[45] July 12, 1977

[54] OZONE GENERATOR

[75] Inventor: Curt William Carlson, Atlanta, Ga.

[73] Assignees: Murray J. Guy, Stamford, Conn.; Richard E. Higginbotham, Atlanta, Ga.; part interest to each

[21] Appl. No.: 644,306

[22] Filed: Dec. 24, 1975

[51] Int. Cl.² .................................. C01B 13/11
[52] U.S. Cl. ......................... 250/533; 250/539
[58] Field of Search ...................... 250/532-541

[56] References Cited

U.S. PATENT DOCUMENTS

| 1,454,219 | 5/1923 | Goedicke | 250/539 |
| 1,839,876 | 1/1932 | Hartman | 250/539 |
| 2,308,111 | 1/1943 | Schuette | 250/539 |
| 2,658,868 | 11/1953 | Collison | 250/539 |
| 3,455,803 | 7/1969 | Miller | 204/176 |
| 3,967,131 | 6/1976 | Slipiec | 250/539 |

Primary Examiner—Howard S. Williams
Assistant Examiner—Aaron Weisstuch
Attorney, Agent, or Firm—Newton, Hopkins & Ormsby

[57] ABSTRACT

An ozone generator in which an air pump discharges air through a plurality of juxtaposed, successive, tubular housings, each of which has concentric wire mesh electrodes separated by dielectric tubes. A high a.c. potential, insufficient to cause a spark discharge, is imposed across the electrodes so that the oxygen of the air is progressively converted into ozone. The ozone laden air is directed through non-return valves into water flowing in a pipe for the purpose of destroying bacteria therein.

20 Claims, 6 Drawing Figures

OZONE GENERATOR

BACKGROUND OF THE INVENTION

1. Field of the Invention

This invention relates to a process and apparatus for generating ozone and is more particularly concerned with an ozone generator for supplying ozone to water for purifying the same.

2. Description of the Prior Art

It is well known that, by passing oxygen through an electrical discharge, sufficient energy will be imparted to the oxygen to convert the oxygen molecules ($O_2$) into ozone molecules ($O_3$). Devices known as ozonizers have been used in the laboratory to generate ozone. Such ozonizers usually consist of a single unit of concentric metal foil electrodes across which an electrostatic charge is imposed. This creates what is known as a silent electric discharge. Such devices are generally inefficient and produce only a dilute mixture of oxygen and ozone from an input of essentially oxygen. Furthermore, the metal foil of the electrodes is easily damaged and may deteriorate with prolonged use. In Europe, ozone has been used in water systems for the purpose of purifying drinking water. Such use, however, has not had wide acceptance in the United States.

For maintaining a low bacteria count, chlorine has been used in swimming pool water; however, substantially no ozone is used for that purpose. Chlorine is an irritating substance which in minute quantities is not toxic; however, I have found that if some or all of the chlorine in swimming pools were replaced with ozone, this would improve the purity of the water.

Accordingly, I have devised a simple and inexpensive ozone generator which progressively reacts the oxygen of the ambient air to produce ozone, the generator having a long useful life for automatically injecting ozone into water or air to purify the same.

SUMMARY OF THE INVENTION

Briefly described, the present invention includes a series of ozonizers or cells, each formed with concentric wire mesh grids, separated by a pair of spaced concentric tubular dielectric members and enclosed in a tubular plastic housing. The tubular dielectric members are spaced apart by a helical spacer. A number of these cells are connected together in series, with an air impeller feeding air under pressure to the first cell, whence it travels through successive cells. In each cell some of the oxygen is converted to ozone, the net result being that a progress increase in the ozone produced. The ozone charged air thus produced is discharged through check valves into an enclosed stream of water circulating to a swimming pool, thereby purifying the water. If desired, the ozone laden air could be discharged into the air in a room for destroying bacteria in the air.

The pairs of grids or electrodes of the cells are connected, in parallel, across the secondary of a transformer. The air impeller, transformer and cells are carried by a housing which is conveniently mounted on a wall.

DESCRIPTION OF THE PREFERRED EMBODIMENT

Figure 1:
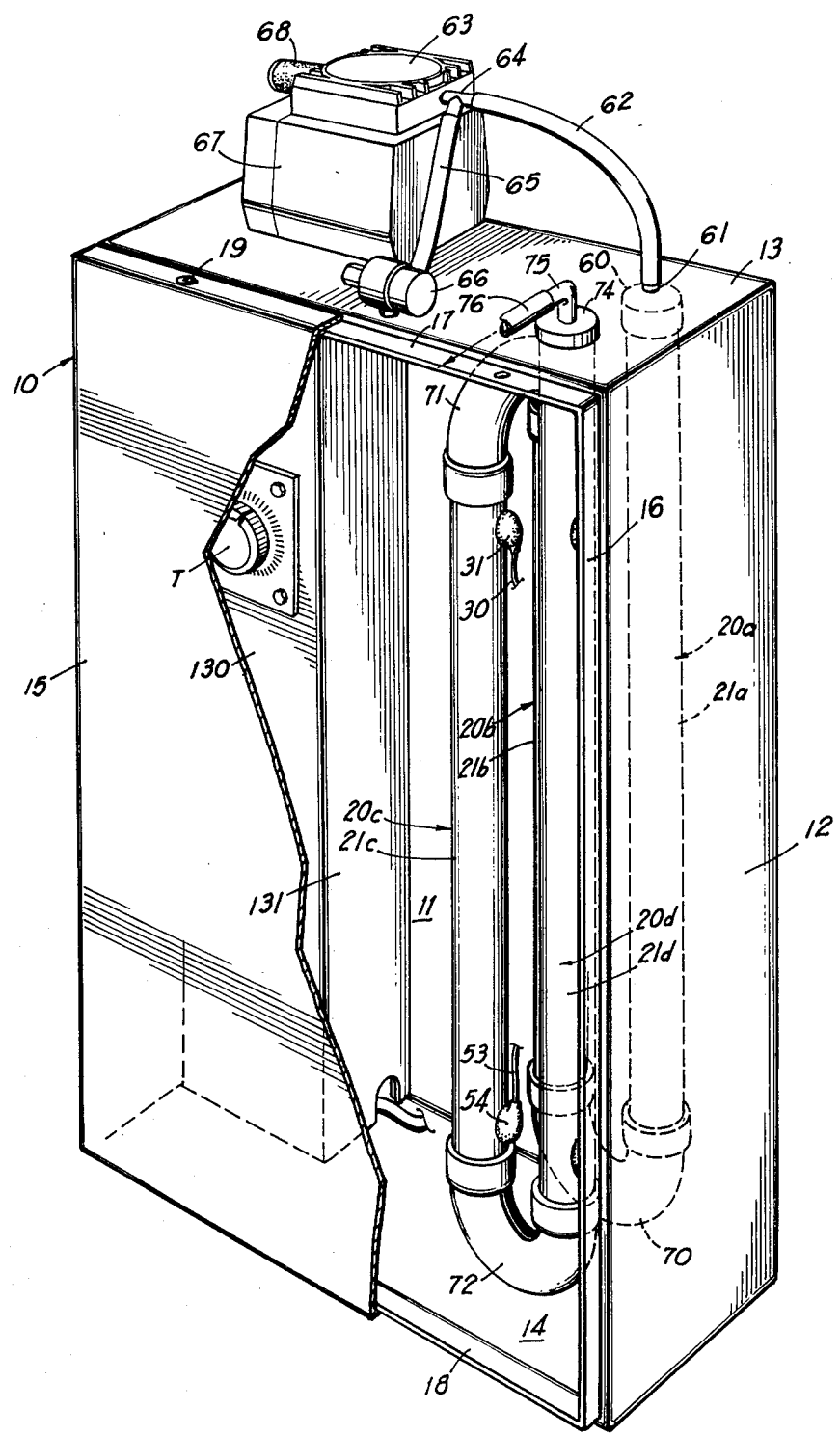
FIG. 1 is a partially broken away perspective view of an ozone generator constructed in accordance with the present invention.

Referring now in detail to the embodiment chosen for the purpose of illustrating the present invention, numeral 10 denotes the main casing, housing or closure of the ozone generator, this housing 10 having a rectangular, flat back 11; a pair of opposed, parallel, vertically disposed, rectangular sides 12 extending forwardly from the side edges of back 11; a rectangular top 13 extending forwardly from the back 11 and joining the upper ends of the sides 12; and a bottom 14 which is parallel to top 13 and extends forwardly from the bottom edge of back 11 and joins the lower end of sides 12.

A removeable front panel 15 is received on the front flanges 16, 17 and 18 of the sides 12, top 13 and bottom 14, being secured in place by locks, screws or other detents 19.

Within housing 10 are a plurality of juxtaposed, elongated, vertically disposed, parallel cells or ozonizers 20a, 20b, 20c and 20d. Each cell 20a, 20b, 20c and 20d has hollow, tubular grid assembly housings 21a, 21b, 21c, 21d respectively, each having an identical grid assembly; therefore the construction of only one grid assembly will be described. The cell 20d, for example, (FIGS. 2 and 3) includes a hollow, tubular, cylindrical housing 21d which is preferably formed from polyvinyl chloride or some other plastic which is not attacked by the ozone. Housing 21d is open at both ends.

Wholly within the housing 21d are the spaced, inner and outer electrodes or grids 22 and 23. The electrodes or grids 22 and 23 are formed from rectangular sheets of stainless steel wire mesh screen. The mesh of electrodes 22 and 23 is between about 20 mesh and about 80 mesh. Preferably the screen is 40 mesh. Below about 20 mesh, the electrical discharge is uneven, causing a current fluctuation. Above about 80 mesh, the air does not readily pass through the charged screen.

Figure 2:
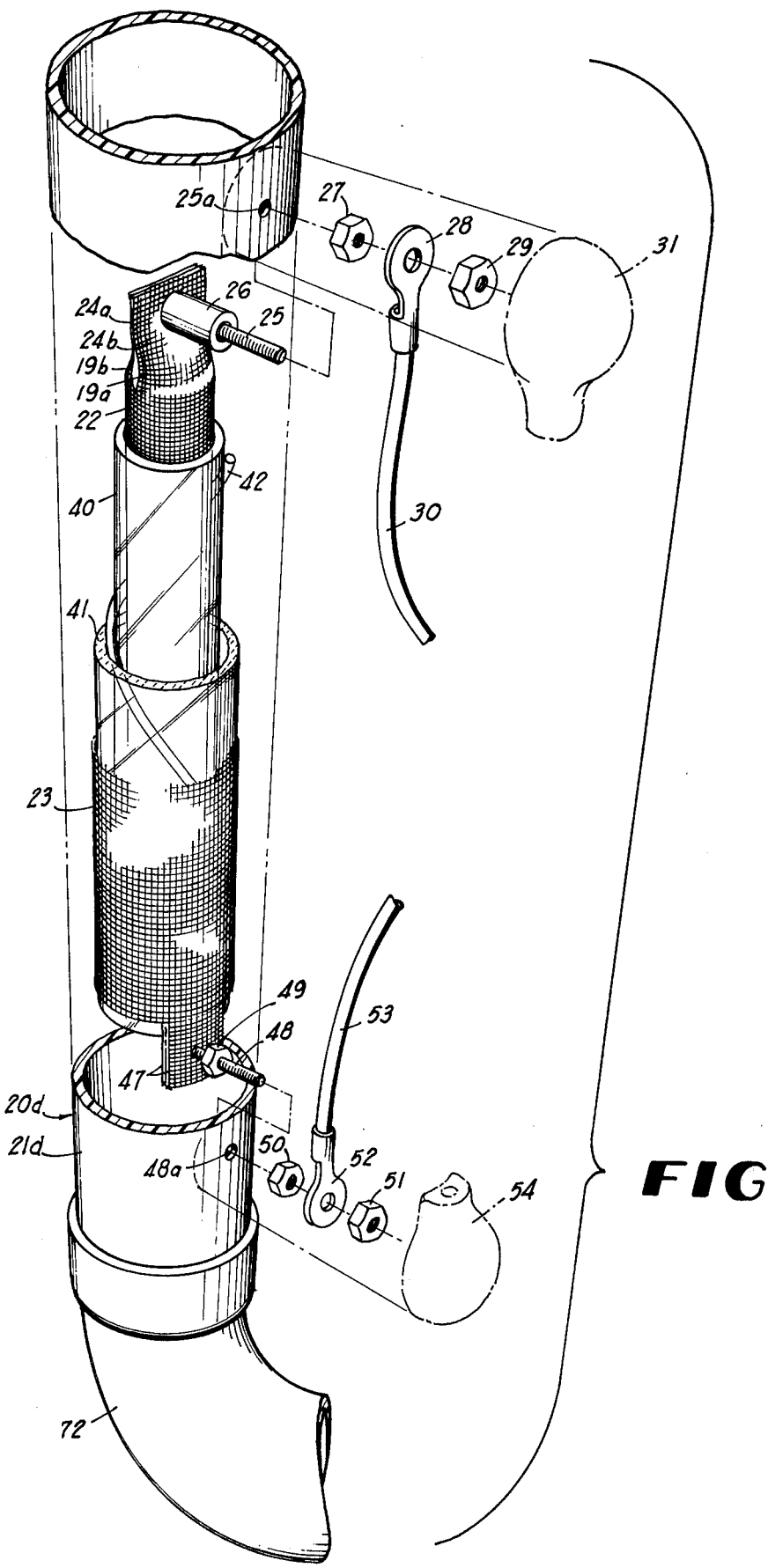
FIG. 2 is an exploded, fragmentary, perspective view of one of the ozone generating cells of the machine shown in FIG. 1.
Figure 3:
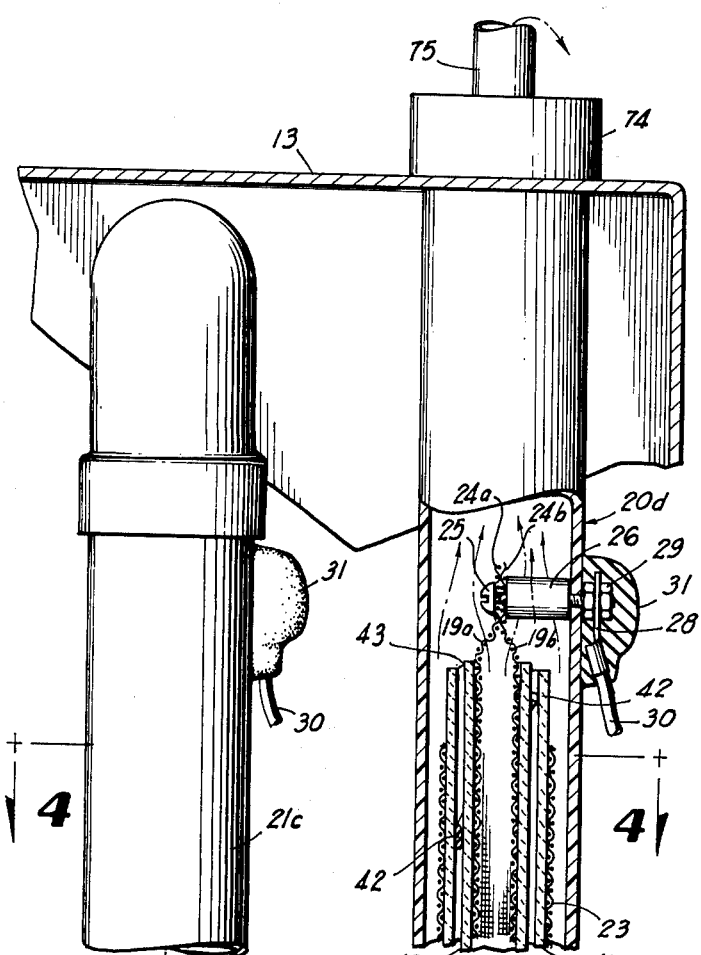
FIG. 3 is a partially broken away, side elevational view showing primarily the last two cells in the series of cells of the machine shown in FIG. 1.
Figure 4:
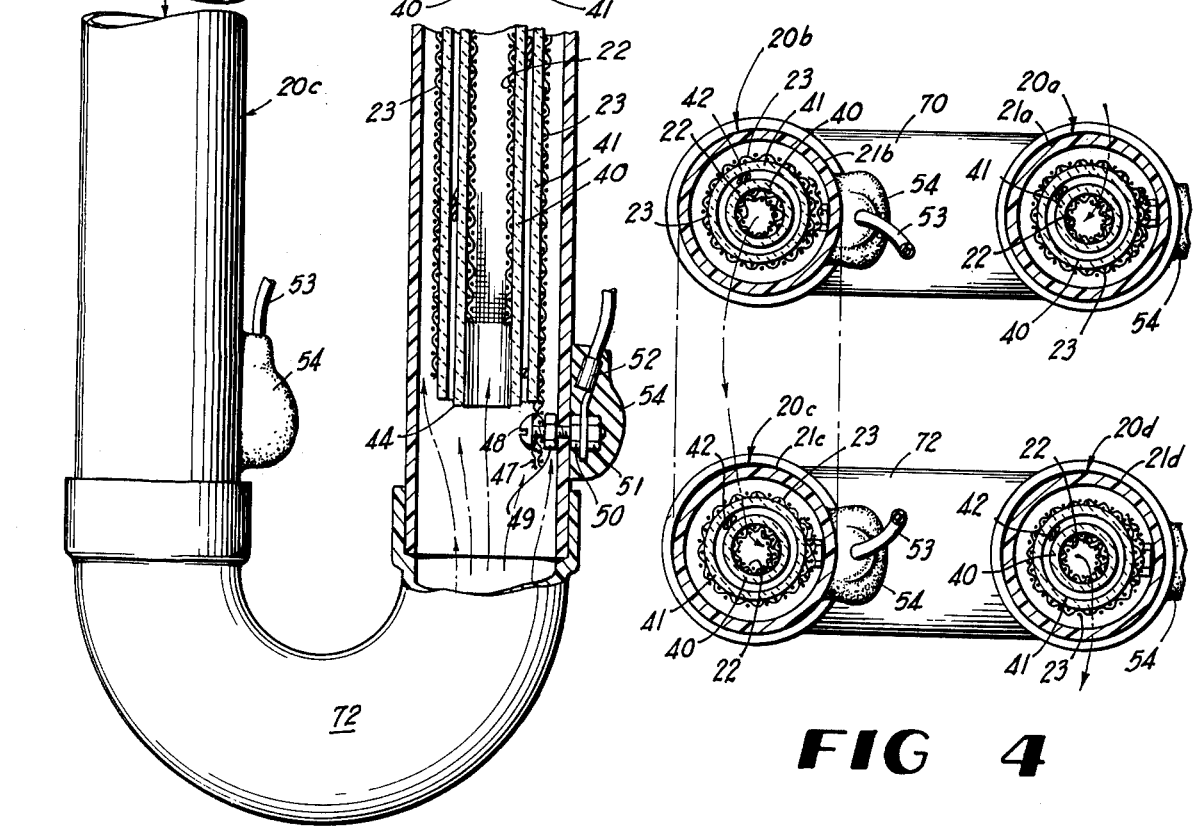
FIG. 4 is a cross sectional view taken substantially along line 4—4 in FIG. 3.

As best seen in FIGS. 2, 3 and 4, the inner electrode or grid 22 is formed from a rectangular sheet of non-corrosive, stainless steel wire, rolled so that preferably the longitudinal edges overlap. The upper end portion of the rolled tube, formed by the grid 22, is flattened and tapers outwardly to provide converging panels 19a, 19b, and outwardly thereof it is cut along axial diametrically opposed portions so as to provide opposed generally flat, parallel contiguous support plates 24a and 24b. The plates 24a, 24b are flattened against each other and are provided with aligned holes through which an electrically conducting terminal or hanger bolt 25 passes. A spacer collar or sleeve 26, preferably of insulating material which is slightly less in length than the diameter of housing 21, is received on the bolt 25. The bolt 25 then passes radially outwardly through a hole 25a in the side of one end portion of housing 21 and is retained in place by a retainer nut 27 fitted on the distal end of bolt 25 and tightened against housing 21d. The bolt 25, however, protrudes beyond the nut 27 and receives an electrical connector 28 which, in turn, is retained in place by an outer nut 29. A cable 30 leads from the connector 28 to the electrical system to be described, hereinafter. An insulating cap 31 through which the cable 30 passes surrounds the protruding bolt 25 as well as the nuts 27 and 29 and the connector 28.

The electrode or grid 22 is coiled, as depicted in FIG. 4, so as to provide two complete convolutions, there being an edge portion of one side edge which overlaps the edge portion of the other side edge as illustrated in FIG. 4. The inner electrode or grid 22 is inserted into a cylindrical tubular inner dielectric member 40 so that the proximal end of the inner electrode 22 protrudes outwardly from the mouth of dielectric member 40 while the distal end of the grid 22 terminates adjacent to but wholly within the other end of the member 40. The dielectric member 40 is longer than the inner grid 22 and, therefore, encompasses substantially the entire body portion of the dielectric member, as best seen in FIG. 3.

An outer dielectric member 41 concentrically surrounds the inner dielectric member 40 and is spaced from the inner dielectric member 40 by a helical spacer 42 which extends around the outer periphery of the inner dielectric member 40 and also receives the inner periphery of the outer dielectric member 41. The inner dielectric member 40 is slightly longer than the outer dielectric member 41 and is provided with outwardly flared diametrically opposed portions 43 at one end and diametrically opposed outwardly flared diametrically opposed portions 44 at the other end which lock the inner dielectric member 40 from any appreciable axial movement with respect to the outer dielectric member 41 while, at the same time, permitting air to pass in a helical path from one end of the two dielectric members 40 and 41 to the other end of the two dielectric members 40 and 41, passing in the space or helical channel between the two members as directed by the helical spacer member 42.

Surrounding substantially the entire length of the outer dielectric member 41 is an outer electrode or grid 23 also formed of stainless steel wire mesh screen cut into rectangular shape and rolled so as to provide overlapping edges as illustrated in FIG. 4. Here again, it is recommended that two convolutions be used. Also, the grid 23 is to be rolled. As viewed in FIG. 3, the lower end of the outer grid 23, in the region of the overlapped portions, is provided with a pair of downwardly protruding tabs denoted by numerals 47. An electrically conducting hanger bolt 48 protrudes though an appropriate hole in the overlapping tabs 47 and is locked in place by an inner lock nut 49 tightened snugly on the bolt 48. Thence, the bolt 48 protrudes through an appropriate hole 48a in the side of the housing 21d and receives an inner nut 50 and an outer nut 51 which sandwich a connector 52, therebetween. A cable 53 is connected to the connector 52 and an insulating cover 54, similar to cover 31, is provided over the nuts 49 and 51 as well as the terminal 52.

The bolt 48 is aligned in the same axial plane with the bolt 25 and, like the bolt 25, protrudes radially outwardly through the same side of the housing 21d. Bolt 25 is disposed inwardly adjacent one end of the housing 21d while the bolt 48 is disposed inwardly adjacent the other end of the housing 21d. By such an arrangement, the bolts 25 and 48 provide the sole support the electrode or grid assembly in a concentric relationship within the housing 21d. When so supported, the electrode assembly is quite firmly held in place so that a portion of air entering one end of the housing 21d will pass up through the inner dielectric member 40, passing through the inner portion of the inner grid 22 and then passing through the substantially closed upper end portion, defined by converging panels 19a, 19b, before passing out of the other end of the housing 21d. Also, a portion of the incoming air will pass around the outer electrode 23. Furthermore, a portion of the air will pass helically, as described above, between the inner and outer dielectric members 40 and 41.

In the present embodiment, four cells 20 are disposed in parallel adjacent relationship to each other, as depicted in FIG. 1. The last cell 20d has a housing 21d which is slightly longer than the housings 21a, 21b or 21c of the remaining cells. The end portion of the housing 21d is thus able to protrude through an appropriate hole in top 13 and is capped by a check valve 74. The first cell 20a is provided at the upper end of housing 21a with a cap 60 having an outwardly protruding nipple 61 which projects through wall 13 and receives one end of a flexible tube 62, the other end of which is connected to the discharge port of a positive displacement air pump 63 through a Tee connection 64. The other end of the Tee connection 64 is connected through a flexible hose 65 to a normally open solenoid valve 66. An electric motor 67 which is mounted on the top wall 13 drives the pump 63 so as to take in air from the atmosphere through a filter 68 and discharge this air through the Tee connection 64 and thence through the flexible tube 62 and the nipple 61 into the housing 21a of the cell 20a.

When the solenoid valve 66 is closed, the air will not be discharged simultaneously through the hose 65 and the valve 66 and therefore a pressure will be built up and air will be delivered under pressure into the first cell 20a. The lower end of the first cell 20a and the lower end of the second cell 20b are connected together by a U-shaped conduit 70, the U-shaped conduit having flanged annular portions which overlap the end portions of the two housings 21a and 21b. In like fashion, the upper end of the housing 21b is connected to the upper end of the housing 21c of cell 20c through a U-shaped conduit 71. Furthermore, the lower end of the housing 21c and the lower end of the housing 21d are connected together by a U-shaped conduit 72 while the upper end of the housing 21d protrudes upwardly through the wall 13 and its end portion which is outwardly of the wall portion receives a check valve 74 provided with an L-shaped nipple 75 which receives a discharge tube 76 for discharging the ozone and air mixture, thus generated. If desired, the tube 76 may deliver the ozone directly to the ambient air for sterilizing the air into a room in which the ozone generator is mounted.

In the present embodiment, however, the tube 76 leads to a second check valve 77 (FIG. 6) connected on the end of an injector nozzle 78, the nozzle 78 being perforated and projecting through and into a pipe 79 through which water is circulated.

It is now seen that the housings 20a, 20b, 20c and 20d define a passageway means for air, the entrance being at cap 60 and the discharge at valve 74.

Figure 6:
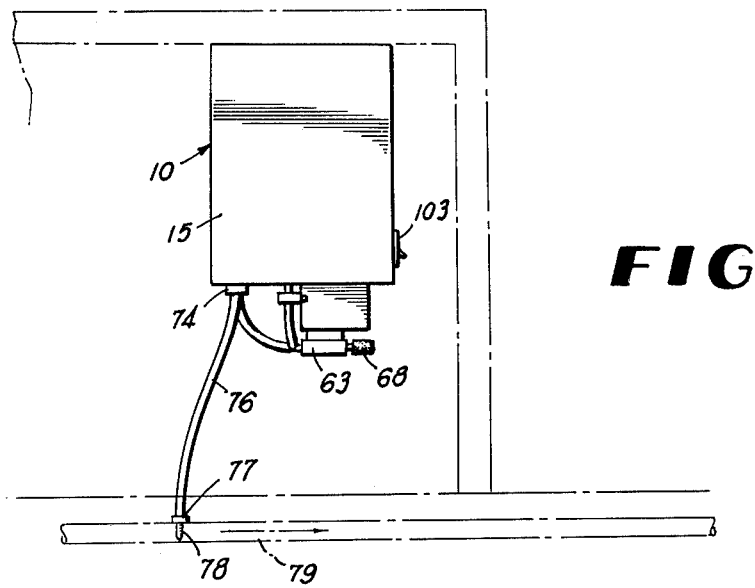
FIG. 6 is a schematic diagram of the ozone generating machine of FIG. 1 connected to feed the ozone, thus generated, into a water system.

As best seen in FIG. 6, it is preferable to mount the housing 10 in a position inverted from the position shown in FIG. 1. This is so that the tube 76 will lead directly to the pipe 79 which is located adjacent thereto. Of course, it makes essentially no difference how the housing 10 is mounted and indeed, in some instances, the housing 10 can be totally portable so that the ozone generator will be portable to be carried from room to room.

Figure 5:
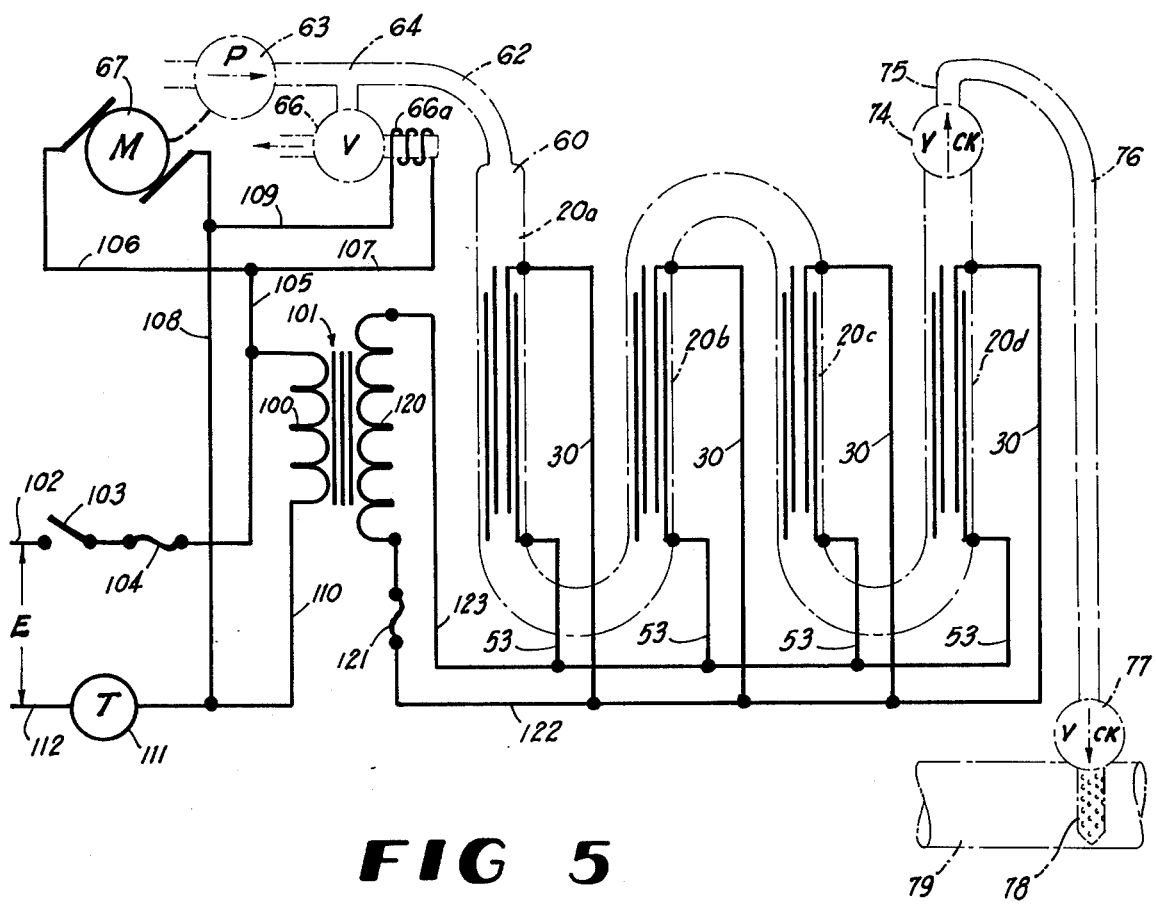
FIG. 5 is a schematic diagram showing both the electrical circuitry and the air flow of the machine shown in FIG. 1.

The electrical circuitry of the ozone generator of the present invention is depicted in FIG. 5. My ozone generator is designed to be utilized with 115 volts a.c. so that it may be connected to any hose current. The motor 67 and the coil 66a of the solenoid valve 66, as well as the primary 100 of a transformer 101, are connected in parallel across the line. Thus, one of the wires 102, leading from the source of current, leads to a normally open on-off switch 103 and thence through a fuse or other current controlling device 104 to a wire 105. One side of the primary coil 100 is connected to wire 105. Also, one side of motor 67 is connected by wire 106 to the wire 105. Furthermore, one side of the solenoid 66a is connected to wire 105 through wire 107. The other side of motor 67 is connected to a wire 108. The other side of solenoid 66a is connected via wire 109 to wire 108 while the other side of the primary coil 100 is connected, via wire 110, to a timer T which is connected, through wire 112, to the other side of the source of current. Wire 108 is connected to wire 110. Thereupon, upon the closing of switch 103, current is supplied simultaneously but intermittently as dictated by timer T to the motor 67, the solenoid 66a and the primary 100, when the timer T so dictates.

The energizing of the motor 67, the solenoid 66 and the primary 100 respectively causes the pump 63 to pump air into the Tee 64 and the valve 66 to close, thereby causing the air delivered to the Tee 64 to pass only through the flexible tube 62 and thence to the cells 20a, 20b, 20c and 20d as described above. The energizing of the primary coil 100 causes a very high voltage to be induced in the secondary coil 120 of the transformer 101. One side of the secondary coil 120 is connected through a fuse 121 or some other current overload regulating device, through wire 122, to one of the cables 30 of each of the electrode assemblies. The other side of the secondary coil 120 is connected by wire 123 to the cables 53 of each of the electrode assemblies. Thus, each of the electrode assemblies is connected electrically across the secondary coil 120 so that the full potential of the secondary coil 120 is applied between the respective electrodes 22 and 23 of each of the electrode assemblies. Preferably the voltage output of the secondary coil 120 is around 7500 volts; however, this voltage can be varied from about 5000 volts to about 15,000 volts, the criteria being that the voltage should not be sufficiently high as to cause visible arcing between the grids 22 and 23 or between terminals i.e. bolts 25 and 48, and yet be sufficiently high that a silent discharge is achieved.

The on-off switch 103 can be conveniently mounted on one side wall 12 of the housing 10, as illustrated in FIG. 6. By programming the timer 111, the amount of ozone fed into a particular stream of water can be regulated so that, for example, where the water in pipe 79 is circulated to and from a swimming pool, the ozone may most effectively take the place of very substantial amounts of chlorine which normally must be present in the pool in order to maintain a low bacteria condition for the water. This prevents the chlorine from irritating the eyes of persons and also reduces the likelihood that a person will have an adverse reaction to the amount of chlorine in the swimming pool.

Through the use of several spaced individual electrode assemblies, the amount of ozone generated from a given quantity of air can be progressively increased so that a very substantial amount of ozone is delivered from the last reaction zone. Hence, the present device, while being quite economical to construct, nevertheless provides a very effective means of converting the oxygen of the air into ozone and also of injecting that ozone into water.

The check valves 74 and 77 assure that the water will not back up into the cells such as cell 20d. Furthermore, by regulating the pressure necessary to open the check valves 74 and 77, the amount of air pressure built up in the cells 20a, 20b, 20c and 20d can be regulated. Furthermore, this pressure is immediately bled off of the system as soon as the timer shuts down. This is due to the deenergization of the solenoid 66a which, in turn, opens the valve 66 when the pump 63 is no longer operating.

In the construction of the present device, it is preferable to mount the transformer 101 within a closed inner housing, such as that formed by the right angularly bent panels 130 and 131 which are disposed within the housing 10, as illustrated in FIG. 1. The timer T is conveniently mounted on the transverse panel 130, as seen in FIG. 1.

In the specific embodiment, the lengths of dielectric members 40 and 41 are each about 16 inches. The length of each grid or electrode is about 15½ inches. The inner dielectric member is 18 m.m. (inside diameter) glass. The outer dielectric member is 25 m.m (inside diamter) glass.

The width of the surface of grid 23 is 6⅝ inches. The width of the inner grid is 5⅜ inches. As pointed out above, each of grids 22 and 23, when rolled, has two complete convolutions so that the side edges overlap along radial planes. Preferably there should not be an overlapping of a partial convolution by more than about 45° since this will lead to uneven discharge.

It is important that when using 12,000 volts for the secondary 120, the distal end of the inner electrode or grid 22 terminate within and at least 2⅛ inches, or more, from the end of the inner dielectric member 40. Also, the distal end of grid 23 should terminate on and at least 2⅛ inches from the end of outer dielecteric member 41. If the potential of the secondary 120 is reduced to 6,000 volts, the spacing of the grids 22, 23 from the ends of the members 40, 41 can be reduced to 1¼ inches. This spacing assures that no arcing will occur between the two electrodes or grids 22 and 23.

When installing the electrode or grid assemblies in the parallel, juxtaposed housings 21a, 21b, 21c, 21d, it is important that all outer grids 23 be connected to one side of the secondary coil 120 and that their hanger bolts 48 be adjacent to each other or at the same end of housing 10 while the inner grids 22 are all connected to the other side of the secondary coil 120 and have their hanger bolts 25 at the other end of the housing 10. This prevents arcing.

The pressure within the passageway formed by the connected housings 21a, 21b, 21c, 21d is from about 3 p.s.i. to about 40 p.s.i. and is preferably about 22 p.s.i. The check valves function on about ½ p.s.i. Thus, the pressure generated in the passageway is dictated as back pressure from the pressure of the water in pipe 79. This water pressure is usually 8 to 16 p.s.i. and can range as high as 40 p.s.i.

If desired, the check valve 74 can be a regulator valve set to lift at a prescribed passageway pressure, such as 22 p.s.i.

When operating with a flow of air of 0.8 to 0.9 cubic feet per minute and a secondary potential of about 7500 volts and a passageway pressure of about 22 p.s.i., the first cell 20a generated about 6 mg./minute of ozone, the second cell 20b measured 16 mg./minute of ozone, the last cell 20d measured 27 mg./minute of ozone. At 115 volts the system pulled 6 amps.

By increasing the number of cells to six, about 35 mg./minute of ozone can be generated by about 7½ amps, and with eight cells, 42 mg./minute of ozone can be generated by 8 amps.

It will be understood by those skilled in the art that while I have chosen to illustrate four individual cells which are disposed in series and which receive compressed air fed from one cell to the next, nevertheless as many cells as desired can be utilized to progressively build up the ozone content of the gas passing through the cells.

What is claimed is:

1. An ozone generator comprising:
  a. a source of electrical potential;
  b. an air pump;
  c. elongated passageway means defining a passageway having an entrance and exit;
  d. means for delivering air from said pump to the entrance of said passageway;
  e. a plurality of grid assemblies disposed in serial spaced relationship within said passageway, each of said grid assemblies having an inner grid, and outer grid, and dielectric means spacing said inner grid and said outer grid apart; and
  f. a plurality of electrically conducting hanger means projecting through the side of said passageway, one grid from each of said assemblies being electrically connected through one of said hanger means to one side of said source and the other grid of each of said assemblies being electrically connected through another of said hanger means to the other side of said source.

2. The ozone generator defined in claim 1 wherein said passageway means includes a plurality of juxtaposed, parallely spaced, serially connected grid housings, each of said housings containing one of said grid assemblies.

3. The ozone generator defined in claim 1 including means at said exit for closing the same, said pump adapted to deliver air in a sufficient volume to produce an air pressure of from about 3 psi to about 40 psi in said passageway.

4. The ozone generator defined in claim 3 wherein said means at said exit includes a regulator valve.

5. The ozone generator defined in claim 3 wherein said means at said exit includes a check valve.

6. The ozone generator defined in claim 5 wherein said means at said exit includes a tube leading from said exit to a water pipe and a nozzle for introducing ozone from said tube into said water pipe.

7. The ozone generator defined in claim 6 including a check valve for preventing water in said pipe from passing into said passageway.

8. The ozone generator defined in claim 1 wherein the grids are circular in cross-section and are disposed in concentric relationship to each other centrally in said passageway.

9. The ozone generator defined in claim 8 wherein said dielectric means includes tubular dielectric means disposed between the concentric grids.

10. The ozone generator defined in claim 9 wherein said grids are each rolled screens.

11. The ozone generator defined in claim 10 wherein said grids project outwardly of said dielectric member in axially opposite directions and wherein said hanger means includes pairs of electrically conducting hangers respectively supporting the protruding ends of said grids, said hangers projecting through the side of said passageway means and being connected to said source of current.

12. The ozone generator defined in claim 11 wherein said dielectric means include a pair of concentrically spaced tubular members forming inner and outer members and spacer means for holding said tubular members in concentric relationship to each other.

13. The ozone generator defined in claim 12 wherein each of the inner grids is connected to one side of said source of current and wherein each of the outer grids is connected to the other side of said source of current.

14. The ozone generator defined in claim 13 wherein said spacer member is helically disposed around the inner dielectric member and engages the inner surface of the outer dielectric member for defining a helical path for air between said dielectric members.

15. The ozone generator defined in claim 1 including a housing and wherein said source of current includes a transformer, the primary of which is adapted to be connected to an a.c. source, one side of the secondary of said transformer being connected to a grid of each of said grid assemblies and the other side of said secondary being connected to the other grid of each of said assemblies.

16. In an ozone generator, a tubular grid assembly housing defining an air passageway therein, a grid assembly disposed within said air passageway, said grid assembly including an inner grid and an outer grid disposed concentrically with respect to each other and with respect to said tubular housing, one of said grids being carried by a hanger projecting through the side of said housing, the other of said grids being supported by a second hanger spaced from the first mentioned hanger and projecting through the side of said housing, and a tubular dielectric means disposed between said concentric grids.

17. The ozone generator defined in claim 16 wherein said grids are each wire screens.

18. The ozone generator defined in claim 16 wherein each of said grids includes convolutions of wire screen, the edges of which overlap.

19. The ozone generator defined in claim 16 wherein said dielectric means includes a pair of tubular glass members disposed concentrically in spaced relationship to each other, and a spacer member for spacing said tubular members from each other.

20. The ozone generator defined in claim 19 wherein said spacer member is helically wound around the inner tubular glass member.

* * * * *